(12) United States Patent
Godefroy

(10) Patent No.: US 6,798,166 B2
(45) Date of Patent: Sep. 28, 2004

(54) ELECTRICAL POWER SYSTEM FOR AN AUTOMOBILE VEHICLE

(75) Inventor: Emmanuel Godefroy, Boulogne Billancourt (FR)

(73) Assignee: Peugeot Citroen Automobiles SA, Neuilly sur Seine (FR)

( * ) Notice: Subject to any disclaimer, the term of this patent is extended or adjusted under 35 U.S.C. 154(b) by 0 days.

(21) Appl. No.: 10/350,575

(22) Filed: Jan. 24, 2003

(65) Prior Publication Data

US 2003/0151386 A1 Aug. 14, 2003

(30) Foreign Application Priority Data

Jan. 24, 2002 (FR) .............................................. 02 00891

(51) Int. Cl.⁷ ................................................. H02J 7/00
(52) U.S. Cl. ....................................................... 320/104
(58) Field of Search ....................... 320/104; 307/10.1; 363/84, 98

(56) References Cited

U.S. PATENT DOCUMENTS 3,668,514 A    6/1972   Peck ........................... 322/128
4,807,106 A  * 2/1989   Baker et al. .................... 363/84
6,049,198 A    4/2000   Schenk .......................... 322/90
6,111,768 A  * 8/2000   Curtiss .......................... 363/98
6,351,104 B1   2/2002   Koelle et al. ................. 322/22
6,433,518 B1   8/2002   Reutlinger .................... 322/28

FOREIGN PATENT DOCUMENTS

DE    198 45 569 A1    4/1999
WO    WO-00 13303 A1   3/2000
WO    WO-00 45497 A1   8/2000

* cited by examiner

*Primary Examiner*—Pat Tibbits
(74) *Attorney, Agent, or Firm*—Fulbright & Jaworski

(57) ABSTRACT

The invention relates to an electrical power supply system for an automobile vehicle comprising an alternator, a first battery with a voltage less than the electromotive force of the alternator, and a second battery with a higher voltage. The first battery is charged while the inductance internal to the alternator is being charged and the second battery is charged while this internal inductance is being discharged. This system comprises for each alternator phase, a controlled switch in series with the first battery, and a diode to charge the second battery, and control means for each controlled switch such that the first battery is charged when this controlled switch is closed, and when the controlled switch is opened after the inductance has been charged, the inductance discharges into the second battery.

10 Claims, 3 Drawing Sheets

ELECTRICAL POWER SYSTEM FOR AN AUTOMOBILE VEHICLE

BACKGROUND OF THE INVENTION

The invention relates to an electrical power supply system for an automobile vehicle.

The electrical power supply for an automobile vehicle is provided using an accumulator battery charged by an alternator, usually driven by a vehicle traction engine.

Most automobile vehicles now use a battery outputting a voltage of 12 V and the corresponding alternator outputs a voltage of 14 V. Since the number of items of equipment consuming electrical energy onboard automobile vehicles is increasing, the power output by the battery also needs to increase. It is becoming quite frequent for each vehicle to be provided with a computer and electrical controls, particularly for the adjustment of seats, assisted braking, suspensions, etc.

The power of a battery with a given voltage (12 V) is proportional to the output current. But an increase in the current also increases the cross section of the power supply cables, which a non-negligible extra cost. This is why the use of accumulator batteries with a higher voltage (36 V) is being considered for the power supply of electrical power sources onboard automobile vehicles. These batteries must be charged at a voltage of 42 V. A voltage of 36 V is high enough to give a substantial power increase without any current increase, and it is also sufficiently low so as not to endanger users.

But in the automobile industry where equipment is produced in large production series, it is difficult to consider changing from one standard to another without a transition, for cost reasons. This is why it is probable that equipment such as lights, computer(s) and small motors will continue to be used with a low voltage (12 V) power supply during a relatively long transition period, and that the high voltage will be used for equipment necessitating more power such as starting, braking, suspensions, etc. Furthermore, for the same cost reasons it would be preferable to be able to continue using low voltage alternators, particularly 14 V, during the transition period, to charge the 12 V and 36 V batteries. Therefore, a circuit is necessary such that the conventional alternator outputting a voltage of 14 V can supply a voltage of 42 V to charge the 36 V battery.

A power supply system for an automobile vehicle has already been proposed by which an alternator outputting a voltage of 14 V could charge a 12 V battery and a 36 V battery. A circuit of this type is shown in FIG. 1.

This known circuit comprises a battery 10 that outputs a voltage of 12 V, a battery 12 outputting a voltage of 36 V, and a three-phase alternator 14 outputting a voltage of 14 V to charge these two 5 batteries. The alternator is of the claw or Lundell type. In this known circuit, a voltage of 42 V can be applied at the terminals of the battery 12 through a voltage boost circuit, that takes advantage of the high internal inductance in each phase of the alternator 14. Each phase terminal $14_i$, $14_2$ and $14_3$ the alternator 14 is connected to the common anode point of a first diode $16_i$ to the cathode of a second diode $18_i$, the cathode of the diode $16_i$ being connected to the "plus" terminal of the battery 12 and the anode of the diode $18_i$ being connected to the "minus" terminal (and therefore the ground) of the same battery 12 outputting a voltage of 36 V. A controlled switch $20_i$ installed in parallel on each of the diodes $18_i$.

Furthermore, each phase terminal 14 is connected to 20 the plus terminal of the 12 V battery 10 through another controlled switch $22_i$.

Thus, the circuit shown in FIG. 2 is obtained for each alternator phase; the alternator 14 supplies power firstly to the battery 10 (12 V) through the inductance $24_i$ phase i and the controlled switch $22_i$, and secondly to the battery 12(36 V) through a diode $16_i$. A switch $20_i$ placed between firstly the point common to the inductance $24_i$ the anode of the diode $16_i$, and secondly the ground to which the negative terminals of the batteries 10 and 12 and one terminal of the alternator 14 are connected.

Operation is illustrated by the diagrams in FIGS. 3a, 3b and 3c. The ordinate of the diagram in FIG. 3a represents the intensity I L of the current in the inductance $24_i$, and the abscissa represents the time t, while the diagrams in FIGS. 3a,3b and 3c also show the intensity 136 of the charge current of battery 12 (FIG. 3b) and the intensity $1_{12}$ of the charge current of the 12V battery 10 (FIG. 3c)

During a first period with duration $\alpha_1 T$ (FIG. 3a), the switch $20_i$ is closed. Under these conditions, the alternator 14 charges inductance $24_i$ and the intensity $I_L$ reaches an intermediate value $I_{nt}$ starting from a minimum value $I_{min}$. During a second phase, the switch $20_i$ is opened and the switch $22_i$ is then closed. Under these conditions, the voltage at the terminal s of battery 10 is the sum of the voltage from this battery and the voltage output by the inductance $24_i$ at continues its charge into the battery 10.

After time $\alpha_2 T$, the switch $22_i$ is open. Under these conditions, the diode $16_i$ arts conducting since its anode voltage is greater than the cathode voltage and thus the alternator 14 supplies power to the 36 V battery 12 through the charged inductance $24_i$. The battery 12 is powered until a time T at which the intensity $I_L$ reaches the value $I_{min}$ (FIG. 3a).

BRIEF SUMMARY OF THE INVENTION

The invention is based on the realisation that there are two disadvantages with the circuit shown in FIG. 1. Firstly this circuit is expensive because two controlled switches have to be supplied per phase and the control is complex. Secondly, there is a period from 0 to $\alpha_1 T$ during each control cycle that is unused for charging either of the batteries.

The invention overcomes these disadvantages.

It relates to an electrical power supply system for a vehicle that comprises a multiphase alternator outputting a given voltage and that will charge a battery with a voltage lower than this given voltage and a battery with a higher voltage. This system comprises a single directional switch for each phase of the alternator through which power is supplied to the low voltage battery, and it is characterised in that the power supply for the battery with a voltage greater than the alternator voltage is not provided with a controlled switch and in that means are provided to control each switch preferably at a frequency significantly greater than the alternator frequency, such that during each control period the switch is closed for a first fraction of the period during which the low voltage battery is charged at the same time that the corresponding phase of the alternator is charged, and is open during a second period during which the higher voltage battery is charged.

With this circuit, only one controlled switch is necessary per phase, and the first fraction of a switch control period is used entirely for charging the lower voltage battery and the second fraction is used entirely for charging the higher voltage battery.

Thus, in general, the invention relates to an electrical power supply system for an automobile vehicle comprising an alternator, a first battery with a voltage less than the electromotive force or the nominal voltage of the alternator, a second battery with a voltage higher than the electromotive force or nominal voltage of the alternator, and control means such that the first battery is charged while the inductance internal to the alternator is being charged and such that the second battery is charged while this internal inductance is being discharged. This system comprises a combination of the following:

for each alternator phase, a controlled switch in series with the first battery with a lower voltage, and a diode means to charge the second higher voltage battery, and control means for each controlled switch such that when each controlled switch is closed, the first battery is charged at the same time as the inductance of the corresponding phase of the alternator, and when the controlled switch is opened after the inductance is charged, it discharges into the second battery.

Preferably, the charge circuit of the second battery does not have a controlled switch.

According to one embodiment, the control means are such that each switch operates at a frequency significantly greater than the operating frequency of the alternator. For example, this control frequency of the controlled switch may be of the order of ten times the operating frequency of the alternator.

According to one embodiment, the control means are such that the fraction of each control period of the controlled switch during which the controlled switch is closed depends on the alternator rotation speed.

The system may comprise a filter capacitor between the cathode of the diode means and the ground. In one embodiment, the system comprises a filter capacitor between a terminal of the controlled switch and the ground.

In one embodiment, the voltage of the first battery is of the order of 12 V, the voltage of the second battery is of the order of 36 V, and the alternator voltage is of the order of 14 V.

As a variant, the voltage of the first battery is of the order of 12 V, the voltage of the second battery is of the order of 36 V and the alternator voltage is of the order of 28 V.

For example, the alternator may be of the claw or Lundell type.

BRIEF DESCRIPTION OF THE DRAWINGS

Other advantages and specificities of the invention will become clear after reading the description of some of its embodiments, this description being made with reference to the drawings mentioned above, wherein.

BRIEF DESCRIPTION OF THE INVENTION

Figure 1:
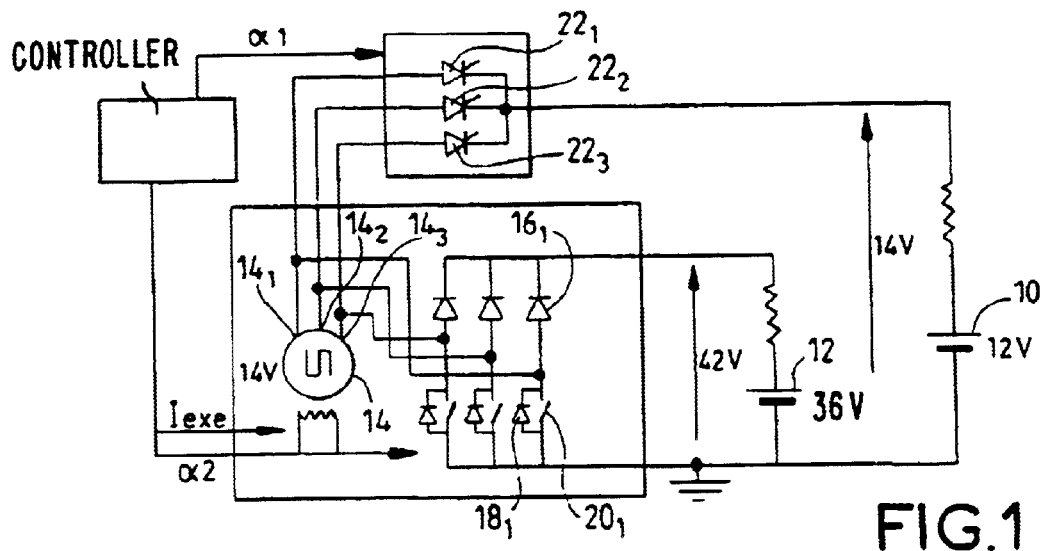
FIGS. 1, 2, 3a, 3b and 3c described above represent a known circuit and diagrams illustrating the operation of this circuit.
Figure 2:
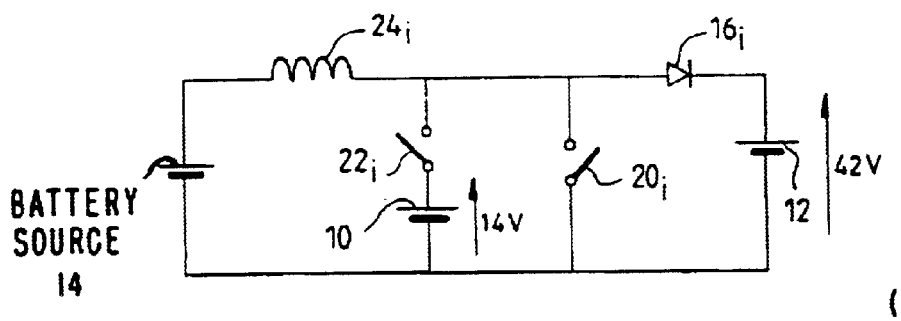
Figure 3A:
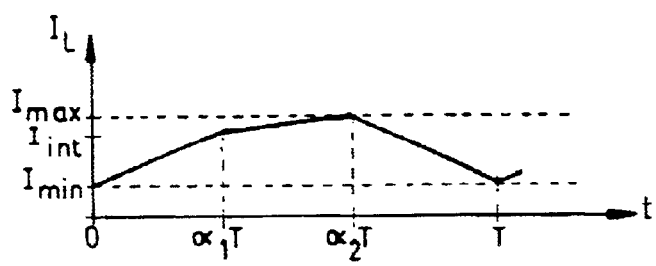
Figure 3B:
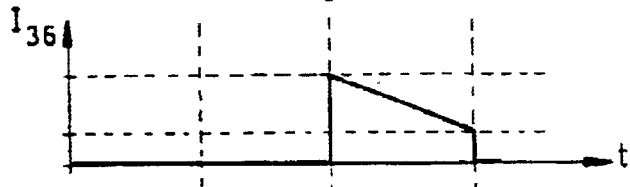
Figure 3C:
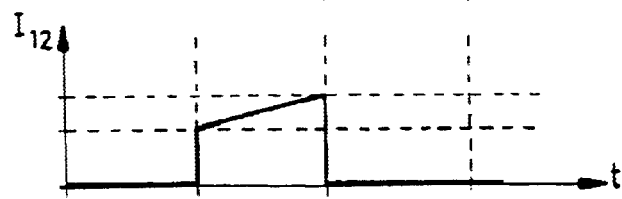
Figure 4:
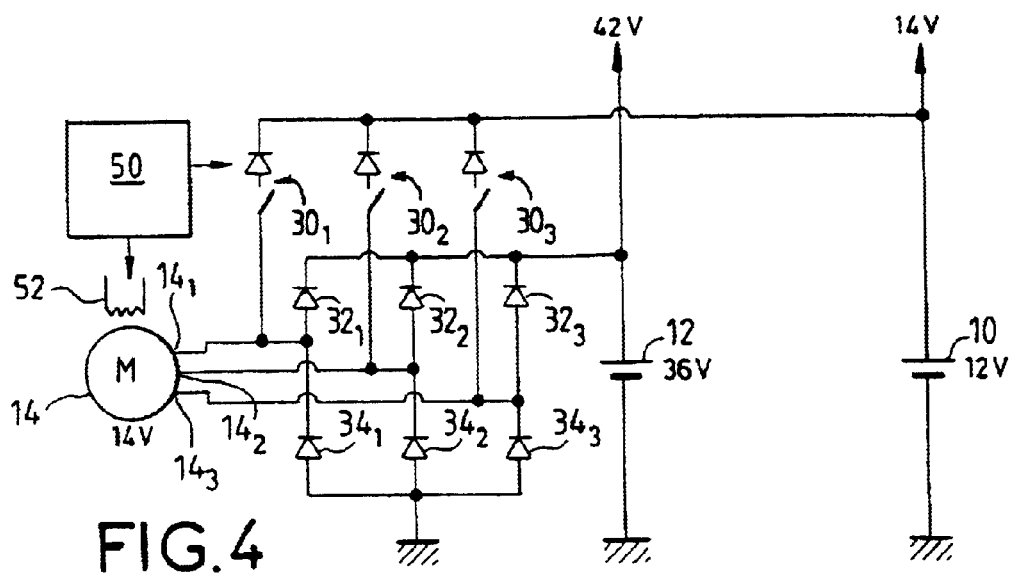
FIG. 4 is a diagram of a circuit in accordance with the present invention.

It is referred firstly to FIG. 4 that shows a 10 circuit like that shown in FIG. 1, that contains a Lundell or claw type alternator 14 designed to charge a 12 V, battery 10 and a 36 V battery 12. As in the circuit shown in FIG. 1, each phase terminal $14_1$, $14_2$ and $14_3$ of the alternator 14 is connected to the positive terminal of the 12 V battery 10 through a non-directional controlled switch $30_1$, $30_2$ and $30_3$ respectively.

Moreover, each phase terminal $14_1$ is connected to the positive terminal of the 36 V battery 12 through a diode $32_1$, $32_2$ and $32_3$ respectively. The connection direction is such that the cathode of each of the diodes is connected to the positive terminal of battery 12. Moreover, each alternator phase terminal $14_i$ connected to the ground through another diode $34_i$ such that the anode of this diode $34_i$ connected to the ground while its cathode is connected to the terminal $14_i$. Unlike the circuit shown in FIG. 1, there is no switch in parallel on each diode $34_i$.

A control box 50 outputs control signals for switches $30_1$, $30_2$ and $30_3$ and the voltage necessary for the excitation winding 52 of the rotor of alternator 14.

As a variant, the alternator 14 may output a 28 V voltage. Alternators with an output voltage of 28 V are already made in production series, particularly for heavy goods vehicles or military vehicles.

Figure 5:
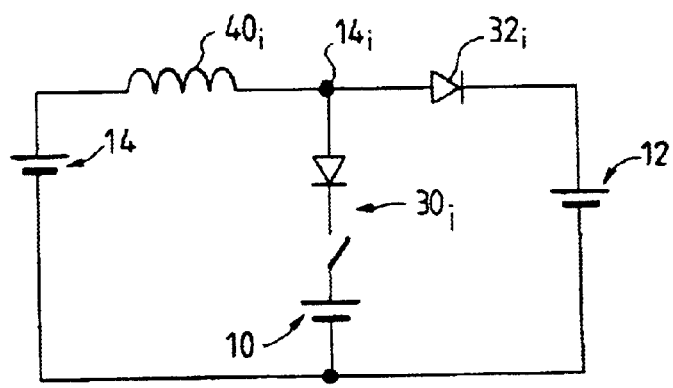
FIG. 5 is a diagram corresponding to a phase of the circuit in FIG. 4, FIGS. 6a and 6b are diagrams illustrating operation of the circuit shown in FIGS. 4 and 5.
Figure 6A:
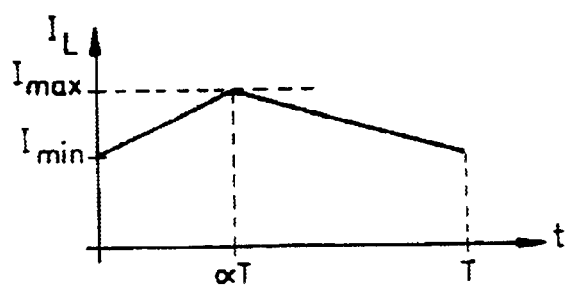
Figure 6B:
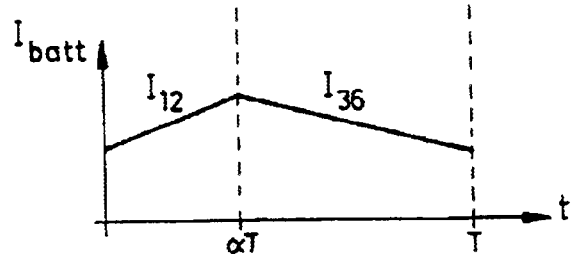

We will now describe operation with reference to FIG. 5 and the diagrams in FIGS. 6a and 6b.

FIG. 5 shows a phase of alternator 14 in series with an inductance $40_i$ for which a terminal $14_i$ (that forms the output terminal of alternator 14)is connected firstly to the anode of diode $32_i$, and secondly to the positive terminal of the 12 V battery 10 through the controlled switch $30_i$.

The switch $30_i$ controlled at a frequency equal to about ten times the operating frequency of the alternator.

Each period of this control frequency with duration 20 T is divided into two parts. During the first part with duration αT (FIG. 6a), the switch $30_i$ closed and the current $I_L$ output by the inductance $40_i$ increases from a first value $I_{min}$ to a second value $I_{max}$. During this fraction αT of the period T, the diode $32_i$ blocked since its anode voltage (12 V) is less than its cathode voltage (36 V). Under these conditions, only the 12 V battery 10 can be charged. At the same time, the inductance $40_i$ being charged.

After time αT, switch $30_i$ opened and the voltage of the charged inductance is added to the voltage output by the alternator itself. This sum of voltages is equal to 42 V and enables the 36 V battery 12 to be charged. Thus, the inductance $40_i$ discharged in battery 12 during the second fraction of the period T from αT to T.

Therefore the first period from 0 to αT is used to charge the 12 V battery, and the second period is used to charge the 36 V battery 12 by a "boost" effect.

The circuit will not work unless the average voltage at the terminals of the inductance $40_i$ zero. In other words, the energy accumulated while this inductance is being charged from time 0 to time αT must be equal to the energy restored when the inductance is being discharged, from time αT to time T.

This condition leads to the following relation between the voltage $E_1$ output by the alternator 14, the voltage $E_2$ output by the battery 10, voltage $E_3$ output by the battery 12 and the coefficient α:

$$(E_1-E_2)\alpha=(E_3-E_1)(1-\alpha)$$

hence $$\alpha = \frac{E_3 - E_1}{E_3 - E_2}$$

Figure 7:
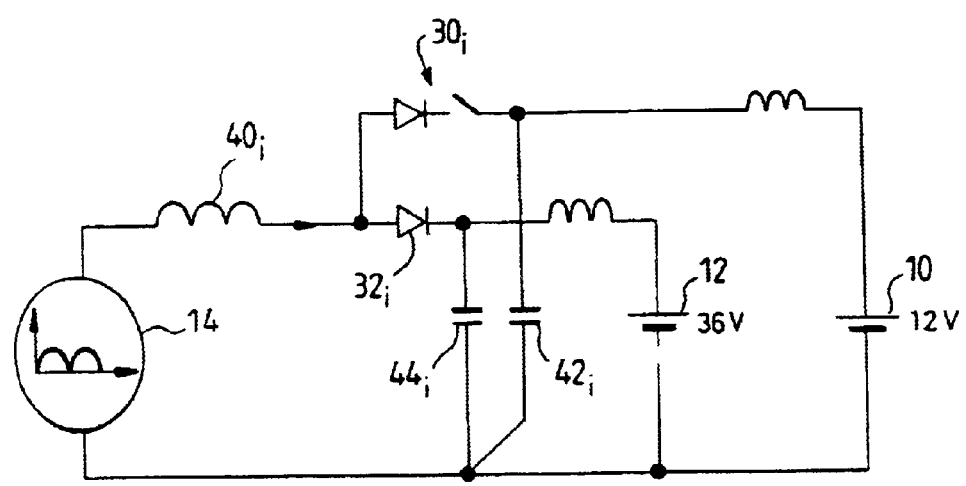
FIG. 7 shows a variant of the diagram in FIG. 4 for one phase.

The circuit shown in FIG. 7 includes firstly a capacitor $42_i$ between the terminal of switch $30_i$ connected to the positive terminal of the battery 10 and the ground, and secondly a capacitor $44_i$ connected between the cathode of diode $32_i$ and the ground, to filter the voltages output to batteries 10 and 12.

A high chopping frequency (with period T) minimizes the capacitance of capacitors $42_i$ and $44_i$. However, this chopping frequency must not be so high that switching losses are prohibitive.

Furthermore, it is preferable if the lengths of the different connection wires are kept short to minimize switching losses, in other words overvoltages due to parasite inductances of wires. In particular, the distance between capacitor $44_i$ and diode $32_i$ and the distance between switch $30_i$ and capacitor $42_i$ are preferably short.

Note that the batteries 10 and 12 themselves form capacitors that contribute to filtering. But this filtering effect is attenuated when the diode $32_i$ and the switch $30_i$ are not close to the batteries. Thus, as the distance between these elements $30_i$ and $32_i$ and the batteries increases, the capacity of the capacitors also needs to be increased.

It is preferable that the output wires from alternator 14 should be shielded since they are subject to fast voltage variations and therefore they can cause electromagnetic interference.

Since the cyclic ratio $\alpha$ depends on the voltage output by alternator 14, in other words its electromotive force $E_1$, and since this electromotive force $E_1$ itself depends on the rotation speed of the alternator (and therefore on the vehicle engine), the coefficient $\alpha$ has to be made to depend on this speed.

The relation between $\alpha$ and the rotation speed can be determined experimentally in advance, and in this case a correspondence table is provided in the memory of the system control means.

Furthermore, the excitation voltage of the alternator rotor (output to winding 52) also depends on the rotation speed.

Although the power supply system shown in FIG. 4 is designed mainly to supply power to two batteries using an alternator with an electromotive force higher than the lower battery voltage and lower than the higher battery voltage, this power supply system can be used in combination with a single battery, for example a 12 V battery or a 36 V battery.

If a 12 V battery is powered, switches $30_1$, $30_2$ and $30_3$ are continuously closed and the voltage is regulated by regulating the excitation voltage output to winding 52.

If the system is used with a 36 V high voltage battery only, switches $30_1$, $30_2$ and $30_3$ are continuously open and in this case the output voltage is regulated by means of the voltage at the terminals of the winding 52.

This power supply system may be used not only to supply power to the batteries, but also to make the alternator 14 operate as a motor, for example for starting.

In this case, power switches are provided instead of diodes $32_1$, $32_2$, $32_3$, $34_1$, $34_2$ and $34_3$. If the 36 V battery 12 is used to supply power to an alternator operating as a motor at a nominal voltage of 24 V, a high input current is applied to this motor which therefore outputs a torque with a high value. Furthermore, the speed range of the electric motor 14 is wider than in the case of a 14 V alternator operating as a motor and powered by a 12 V battery.

If switches are provided instead of diodes $32_i$ and $34_i$, these controlled switches may be used to protect the alternator 14 against overvoltages.

If the motor (alternator) 14 is powered by a voltage greater than its nominal voltage, unwanted overvoltages can occur. Therefore, a detector (not shown) detecting this type of overvoltage is provided to supply a signal to the computer 50, and the computer controls the switches to short circuit the motor phases to ground if such overvoltages occur.

Furthermore, the use of an alternator with a nominal voltage lower than the highest voltage enables good impedance matching of the alternator with the high voltage network, which guarantees high efficiency of the circuit consisting of the alternator and the rectification circuits and therefore a high nominal output power.

What is claimed is:

1. Electrical power system for an automobile vehicle comprising;

an alternator comprising a plurality of phases;

a first battery with a voltage less than an electromotive force or nominal voltage of the alternator;

a second battery with a voltage higher than the electromotive force or nominal voltage of the alternator;

a controlled switch in series with the first battery for each phase of the alternator;

diode means for charging the second battery for each phase of the alternator; and control means for opening and closing each controlled switch to charge the first battery while an inductance internal to the alternator is being charged and charge the second battery while the inductance is being discharged; and wherein the control means is operable to close a controlled switch such that the first battery is charged at the same time as an inductance corresponding to the phase of the alternator associated with said closed controlled switch and to open said closed controlled switch after the inductance corresponding to the phase of the alternator is charged such that the inductance discharges into the second battery.

2. System according to claim 1, wherein each diode means for charging the second battery does not include a controlled switch.

3. System according to claim 1, wherein the control means is operable to operate each controlled switch at a frequency significantly greater than the operating frequency of the alternator.

4. System according to claim 3, wherein the control frequency of each controlled switch is of the order of ten times the operating frequency of the alternator.

5. System according to claim 1, wherein the control means is operable to close each control switch for a fraction ($\alpha$T) of each control period associated with said each control switch, the fraction being depended on a rotation speed of the alternator.

6. System according to claim 1, further comprising a filter capacitor between a cathode of each diode means and the ground.

7. System according to claim 1, further comprising a filter capacitor between a terminal of each controlled switch and the ground.

8. System according to claim 1, wherein the voltage of the first battery is of the order of 12 V, the voltage of the second battery is of the order of 36 V, and the voltage of the alternator is of the order of 14 V.

9. System according to claim 1, wherein the voltage of the first battery is of the order of 12 V, the voltage of the second battery is of the order of 36 V and the alternator voltage is of the order of 28 V.

10. System according to claim 1, wherein the alternator is of the claw or Lundell type.

* * * * *